United States Patent
Sutherland et al.

(10) Patent No.: US 12,539,587 B2
(45) Date of Patent: Feb. 3, 2026

(54) FASTENER DELIVERY MECHANISM FOR A FASTENER DRIVER

(71) Applicant: TECHTRONIC CORDLESS GP, Anderson, SC (US)

(72) Inventors: Scott A. Sutherland, Greenville, SC (US); Curt A. Laugh, Anderson, SC (US); Elton L. Watson, Greenville, SC (US); Edward A. Pomeroy, Piedmont, SC (US)

(73) Assignee: Techtronic Cordless GP, Anderson, SC (US)

( * ) Notice: Subject to any disclaimer, the term of this patent is extended or adjusted under 35 U.S.C. 154(b) by 20 days.

(21) Appl. No.: 18/495,957

(22) Filed: Oct. 27, 2023

(65) Prior Publication Data
US 2024/0149416 A1 May 9, 2024

Related U.S. Application Data

(60) Provisional application No. 63/501,016, filed on May 9, 2023, provisional application No. 63/383,178, filed (Continued)

(51) Int. Cl.
B25C 1/00 (2006.01)
B25C 1/04 (2006.01)
B25C 1/06 (2006.01)

(52) U.S. Cl.
CPC .............. B25C 1/003 (2013.01); B25C 1/047 (2013.01); B25C 1/06 (2013.01)

(58) Field of Classification Search
CPC ........... B25C 1/003; B25C 1/047; B25C 1/06; B25C 1/008; B25C 1/04; B25C 1/041; B25C 1/043
See application file for complete search history.

(56) References Cited

U.S. PATENT DOCUMENTS 2,796,608 A   6/1957   Johnson
3,524,576 A   8/1970   Bader
(Continued)

FOREIGN PATENT DOCUMENTS

CA        986251 A    3/1976
CN    201012490 Y    1/2008
(Continued)

OTHER PUBLICATIONS

Extended European Search Report for Application No. 23206052.5 dated May 31, 2024 (9 pages).
(Continued)

Primary Examiner — Veronica Martin
(74) Attorney, Agent, or Firm — Michael Best & Friedrich LLP

(57) ABSTRACT

A powered fastener driver includes a housing, a nosepiece extending from the housing, a driver blade movable within the nosepiece between a top-dead-center (TDC) position and a bottom-dead-center (BDC) position, a piston coupled to the driver blade for movement therewith, a driver cylinder within which the piston is movable and in fluid communication with a pressurized gas acting on the piston, a magazine coupled to the nosepiece in which collated fasteners are receivable, a fastener delivery mechanism for loading individual fasteners into the nosepiece from the magazine, and a lifter assembly including a lifter housing, a drive shaft rotatably disposed within the lifter housing, a lifter sprocket disposed on the drive shaft for moving the driver blade from the BDC position toward the TDC position, and a cam rotatable in response to rotation of the drive shaft for actuating the fastener delivery mechanism.

20 Claims, 16 Drawing Sheets

Related U.S. Application Data on Nov. 10, 2022, provisional application No. 63/383,027, filed on Nov. 9, 2022.

(56) References Cited

U.S. PATENT DOCUMENTS

| | | | |
|---|---|---|---|
| 3,543,987 A | 12/1970 | Obergfell et al. |
| 3,558,031 A | 1/1971 | Hillier |
| 3,688,966 A | 9/1972 | Perkins et al. |
| 3,703,981 A | 11/1972 | Smith |
| 3,708,097 A | 1/1973 | Fisher |
| 3,847,322 A | 11/1974 | Smith |
| 3,854,648 A | 12/1974 | Inzoli et al. |
| 3,858,782 A | 1/1975 | Pomeroy |
| 3,930,297 A | 1/1976 | Potucek et al. |
| 3,945,551 A | 3/1976 | Sato et al. |
| 4,610,381 A | 9/1986 | Kramer et al. |
| 4,858,812 A | 8/1989 | Fealey |
| 5,031,489 A | 7/1991 | Young et al. |
| 5,240,161 A | 8/1993 | Kaneko |
| 5,480,087 A | 1/1996 | Young et al. |
| 5,634,582 A | 6/1997 | Morrison, Jr. et al. |
| 5,683,024 A | 11/1997 | Eminger et al. |
| 5,772,098 A | 6/1998 | Crutcher |
| 5,799,856 A | 9/1998 | Mukoyama |
| 6,223,966 B1 | 5/2001 | Nayrac et al. |
| 6,382,493 B1 | 5/2002 | Cheng |
| 6,422,447 B1 | 7/2002 | White et al. |
| 6,431,430 B1 | 8/2002 | Jalbert et al. |
| 6,488,195 B2 | 12/2002 | White et al. |
| 6,499,643 B1 | 12/2002 | Hewitt |
| 6,672,498 B2 | 1/2004 | White et al. |
| 6,966,476 B2 | 11/2005 | Jalbert et al. |
| 7,137,186 B2 | 11/2006 | Wojcicki et al. |
| 7,455,207 B2 | 11/2008 | Wojcicki et al. |
| 7,686,197 B2 | 3/2010 | Kosuge et al. |
| 7,699,201 B2 | 4/2010 | Hagan et al. |
| 7,762,443 B2 | 7/2010 | Tamura et al. |
| 7,766,206 B2 | 8/2010 | Kurth et al. |
| 7,866,521 B2 | 1/2011 | Gross et al. |
| 7,896,212 B2 | 3/2011 | Uejima et al. |
| 7,938,303 B2 | 5/2011 | Tamura et al. |
| 7,950,556 B2 | 5/2011 | Hagan |
| 8,011,441 B2 | 9/2011 | Leimbach et al. |
| 8,011,547 B2 | 9/2011 | Leimbach et al. |
| 8,051,919 B2 | 11/2011 | Hagan et al. |
| 8,230,941 B2 | 7/2012 | Leimbach et al. |
| 8,267,296 B2 | 9/2012 | Leimbach et al. |
| 8,267,297 B2 | 9/2012 | Leimbach et al. |
| 8,276,798 B2 | 10/2012 | Moeller et al. |
| 8,286,722 B2 | 10/2012 | Leimbach et al. |
| 8,302,832 B2 | 11/2012 | Porth et al. |
| 8,387,718 B2 | 3/2013 | Leimbach et al. |
| 8,485,407 B2 | 7/2013 | Liu et al. |
| 8,544,561 B2 | 10/2013 | Aihara |
| 8,602,282 B2 | 12/2013 | Leimbach et al. |
| 8,602,283 B2 | 12/2013 | Tamura et al. |
| 8,636,185 B2 | 1/2014 | Largo et al. |
| 8,657,173 B2 | 2/2014 | Uejima et al. |
| 8,763,874 B2 | 7/2014 | McCardle et al. |
| 8,925,780 B2 | 1/2015 | Largo et al. |
| 8,931,677 B2 | 1/2015 | Porth et al. |
| 9,242,359 B2 | 1/2016 | Staples et al. |
| 9,636,812 B2 | 5/2017 | Pedicini |
| 9,676,088 B2 | 6/2017 | Leimbach et al. |
| 11,224,960 B2 | 1/2022 | Garces et al. |
| 11,446,801 B2 | 9/2022 | Aizawa et al. |
| 2002/0017548 A1 | 2/2002 | Jalbert et al. |
| 2003/0034377 A1 | 2/2003 | Porth et al. |
| 2006/0180631 A1 | 8/2006 | Pedicini et al. |
| 2007/0108250 A1 | 5/2007 | Odoni et al. |
| 2015/0352702 A1* | 12/2015 | Chien ............... B25C 1/047 |
| | | 227/130 |
| 2016/0229043 A1 | 8/2016 | Wyler et al. |
| 2016/0288305 A1 | 10/2016 | McCardle et al. |
| 2017/0266796 A1 | 9/2017 | Leimbach et al. |
| 2018/0126527 A1 | 5/2018 | Pomeroy et al. |
| 2018/0126528 A1 | 5/2018 | Pomeroy et al. |
| 2018/0126529 A1 | 5/2018 | Pomeroy et al. |
| 2018/0126530 A1 | 5/2018 | Pomeroy et al. |
| 2018/0154505 A1 | 6/2018 | Sato et al. |
| 2018/0178361 A1 | 6/2018 | Kabbes et al. |
| 2019/0314967 A1* | 10/2019 | Garces ............... B25C 1/047 |
| 2021/0023686 A1* | 1/2021 | Tan ..................... B25C 1/06 |
| 2021/0031348 A1 | 2/2021 | Kobori et al. |
| 2021/0347022 A1 | 11/2021 | Leathrum et al. |
| 2022/0088758 A1 | 3/2022 | Garces et al. |
| 2022/0161404 A1 | 5/2022 | Lim et al. |

FOREIGN PATENT DOCUMENTS

| | | |
|---|---|---|
| CN | 201128144 Y | 10/2008 |
| CN | 205097145 U | 3/2016 |
| CN | 206154233 U | 5/2017 |
| JP | S54133682 A | 10/1979 |
| JP | 5092375 A | 4/1993 |
| JP | 2004090145 A | 3/2004 |
| WO | 2008032572 A1 | 3/2008 |
| WO | 2019204096 A1 | 10/2019 |

OTHER PUBLICATIONS

Niemiec, "Selecting, Using, and Maintaining Pneumatic Tools for Installing Fasteners into Wood," Extension Circular 1332, dated Nov. 1993 (8 pages).

Duo-Fast, "A Catalog of Duo-Fast Staplers, Tackers, Nailers and the Staples and Nails they drive," catalog published 1969 (32 pages).

* cited by examiner

FASTENER DELIVERY MECHANISM FOR A FASTENER DRIVER

CROSS-REFERENCE TO RELATED APPLICATIONS

This application claims priority to U.S. Provisional Patent Application No. 63/501,016 filed on May 9, 2023, U.S. Provisional Patent Application No. 63/383,178 filed on Nov. 10, 2022, and U.S. Provisional Patent Application No. 63/383,027 filed on Nov. 9, 2022, the entire contents of each of which are incorporated herein by reference.

FIELD OF THE DISCLOSURE

The present disclosure relates to fastener drivers, and more particularly to fastener delivery mechanisms for fastener drivers.

BACKGROUND OF THE DISCLOSURE

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE DISCLOSURE

The present disclosure provides, in one aspect, a powered fastener driver that includes a housing, a nosepiece extending from the housing, a driver blade movable within the nosepiece between a top-dead-center (TDC) position and a bottom-dead-center (BDC) position, a piston coupled to the driver blade for movement therewith, a driver cylinder within which the piston is movable and in fluid communication with a pressurized gas acting on the piston, a magazine coupled to the nosepiece in which collated fasteners are receivable, a fastener delivery mechanism for loading individual fasteners into the nosepiece from the magazine, and a lifter assembly including a lifter housing, a drive shaft rotatably disposed within the lifter housing, a lifter sprocket disposed on the drive shaft for moving the driver blade from the BDC position toward the TDC position, and a cam rotatable in response to rotation of the drive shaft for actuating the fastener delivery mechanism.

The fastener delivery mechanism may comprise a spring-loaded advancer support post slidably disposed within a bracket at least partially disposed on the nosepiece.

The fastener delivery mechanism may further comprise an advancer disposed on an end of the advancer support post.

The advancer may move along a group of collated fasteners to load individual fasteners from the group of collated fasteners into the nosepiece one at a time.

The fastener delivery mechanism may further comprise a rocker arm having a proximal end that follows the cam.

The rocker arm may include a forked distal end that fits around and engages a lateral post on the advancer support post.

As the rocker arm is rotated by the cam, the forked distal end may move the advancer support post into the bracket and moves the advancer along the group of collated fasteners to engage a next fastener from the group of collated fasteners.

In response to continued rotation of the cam, the distal end of the rocker arm may move past the cam and the advancer support post is biased to a ready position to move the advancer toward the nosepiece to deliver the next fastener into the nosepiece.

The present disclosure provides, in another aspect, a powered fastener driver that includes a housing, a nosepiece extending from the housing, a driver blade movable within the nosepiece between a top-dead-center (TDC) position and a bottom-dead-center (BDC) position along a fastener delivery axis, a piston coupled to the driver blade for movement therewith, a driver cylinder within which the piston is movable and in fluid communication with a pressurized gas acting on the piston, a magazine coupled to the nosepiece in which collated fasteners are receivable, a lifter assembly for moving the driver blade from the BDC position toward the TDC position, the lifter assembly including a drive shaft, and a fastener delivery mechanism configured to load individual fasteners into the nosepiece from the magazine, the fastener delivery mechanism including a cam rotatable in response to rotation of the drive shaft for actuating the fastener delivery mechanism, and a rocker arm having a rounded proximal end that follows the cam.

The rocker arm may further include a distal end and an advancer support post is engaged with the distal end of the rocker arm.

The fastener delivery mechanism may further include an advancer disposed on the advancer support post.

The advancer may move away from the nosepiece as the rocker arm is driven by the cam.

The advancer may move along a group of collated fasteners to load individual fasteners from the group of collated fasteners into the nosepiece one at a time.

The rocker arm may be rotated by the cam to move the advancer along the group of collated fasteners to engage a next fastener from the group of collated fasteners.

In response to continued rotation of the cam, the rocker arm may move past the cam and the advancer is biased toward the nosepiece to deliver the next fastener into the nosepiece.

The present disclosure provides, in still another aspect, a powered fastener driver that includes a housing, a nosepiece extending from the housing, a driver blade movable within the nosepiece between a top-dead-center (TDC) position and a bottom-dead-center (BDC) position, a piston coupled to the driver blade for movement therewith, a driver cylinder within which the piston is movable and in fluid communication with a pressurized gas acting on the piston, a magazine coupled to the nosepiece in which collated fasteners are receivable, a lifter assembly including a lifter housing, a drive shaft rotatably disposed within the lifter housing, a first lifter sprocket disposed on the drive shaft to move the driver blade from the BDC position toward the TDC position, and a fastener delivery mechanism configured to load individual fasteners into the nosepiece from the magazine, the fastener delivery mechanism including a cam rotatable in response to rotation of the drive shaft for actuating the fastener delivery mechanism, a rocker arm driven by the cam, and an advancer movable by the rocker arm.

The advancer may move away from the nosepiece as the rocker arm is driven by the cam.

The advancer may move along a group of collated fasteners to load individual fasteners into the nosepiece.

The rocker arm may be rotated by the cam to move the advancer along the group of collated fasteners to engage a next fastener from the group of collated fasteners.

In response to continued rotation of the cam, the rocker arm moves past the cam and the advancer is biased toward the nosepiece to deliver the next fastener into the nosepiece.

Figure 1:
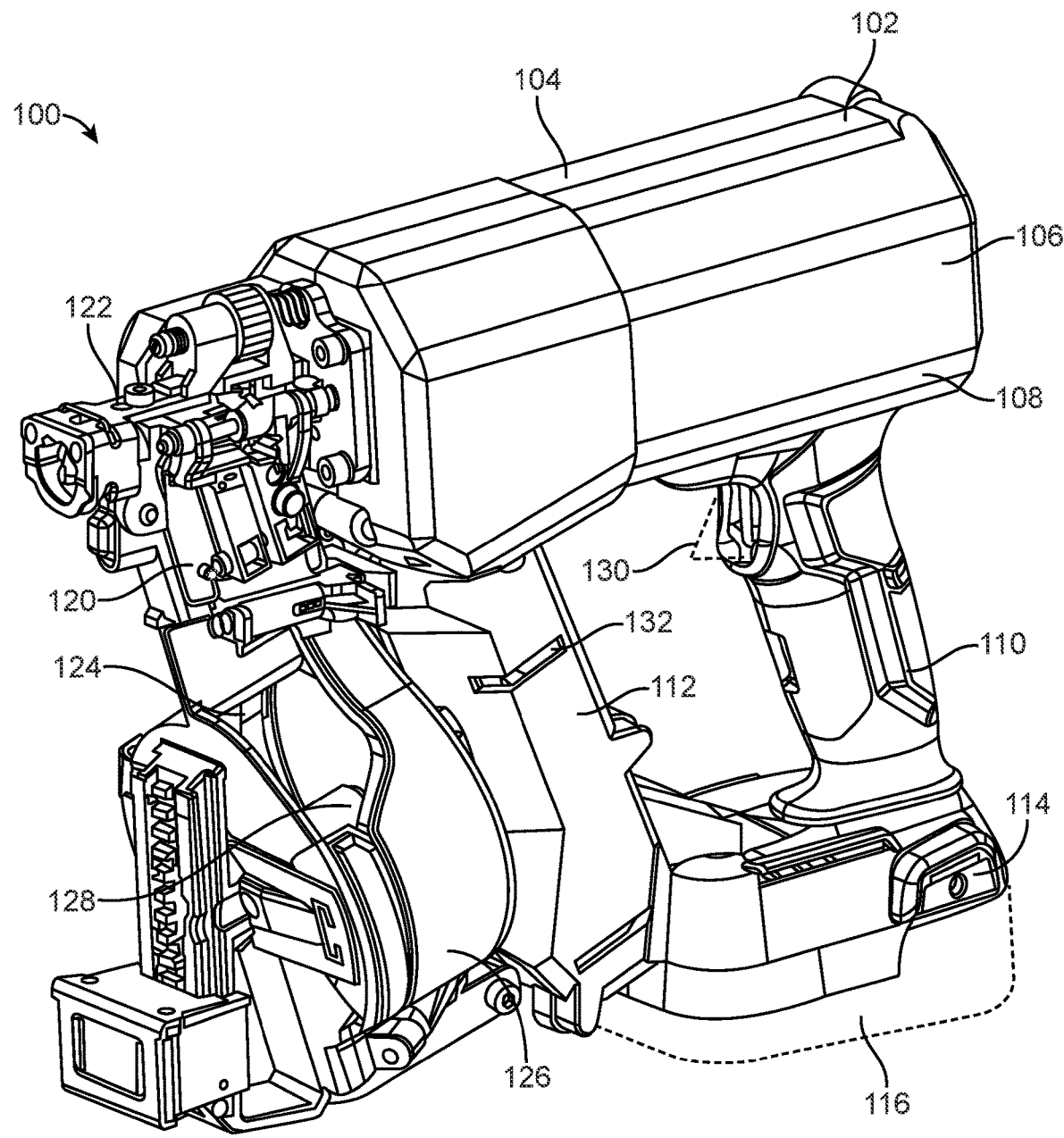
FIG. 1 is a perspective view of a gas-spring powered fastener driver.
Figure 2:
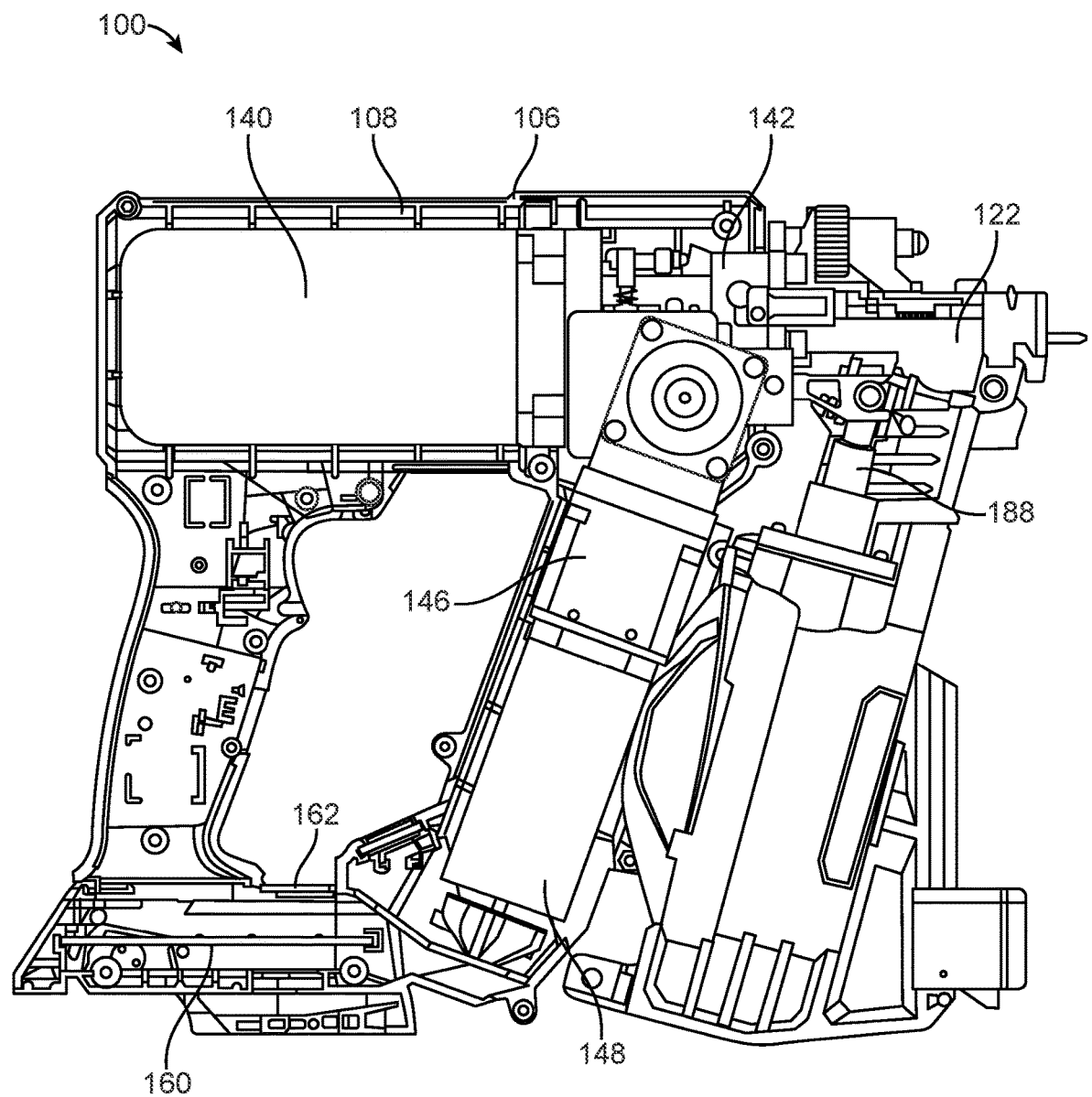
FIG. 2 is a first side plan view of the gas-spring powered fastener driver of FIG. 1 with a portion of the housing removed.
Figure 3:
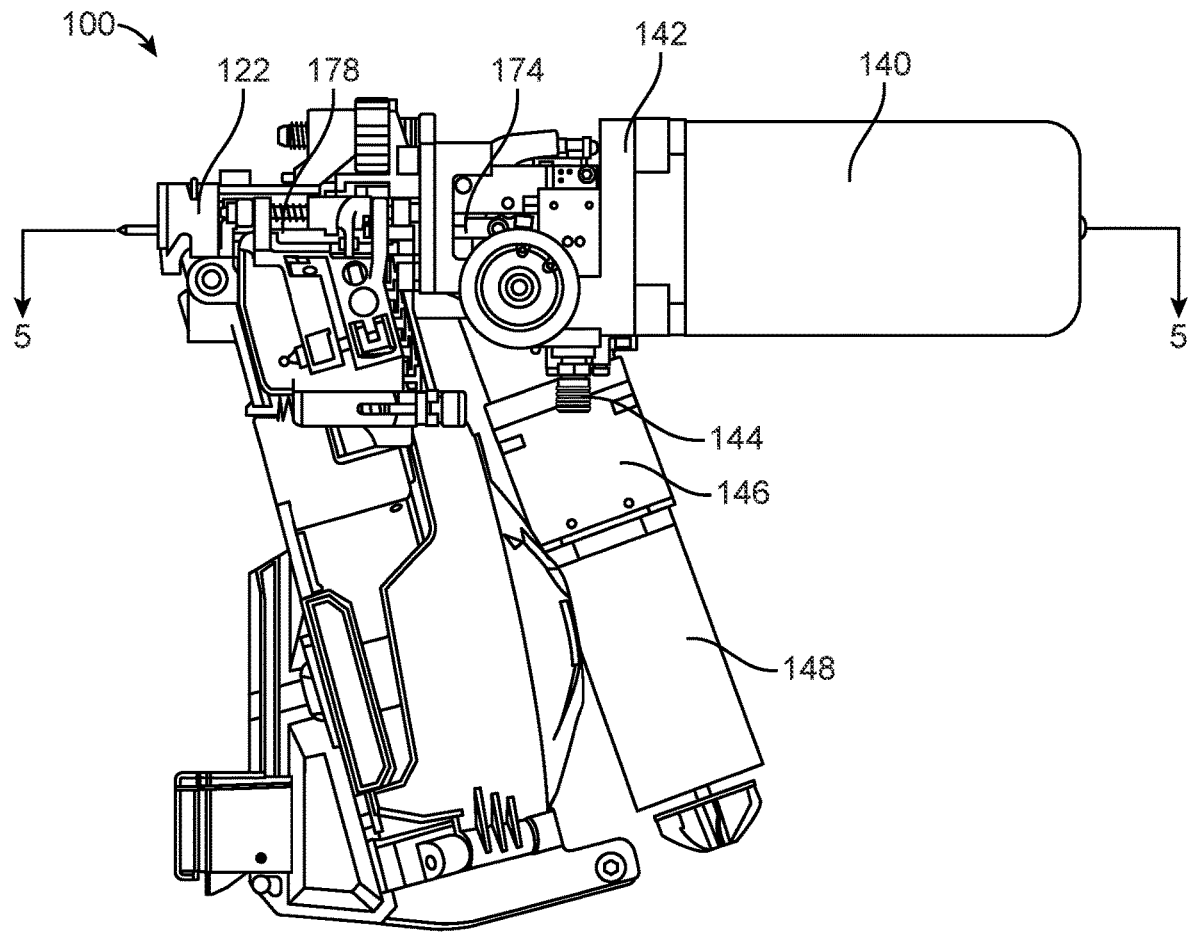
FIG. 3 is a second side plan view of the gas-spring powered fastener driver of FIG. 1 with the housing removed.
Figure 4:
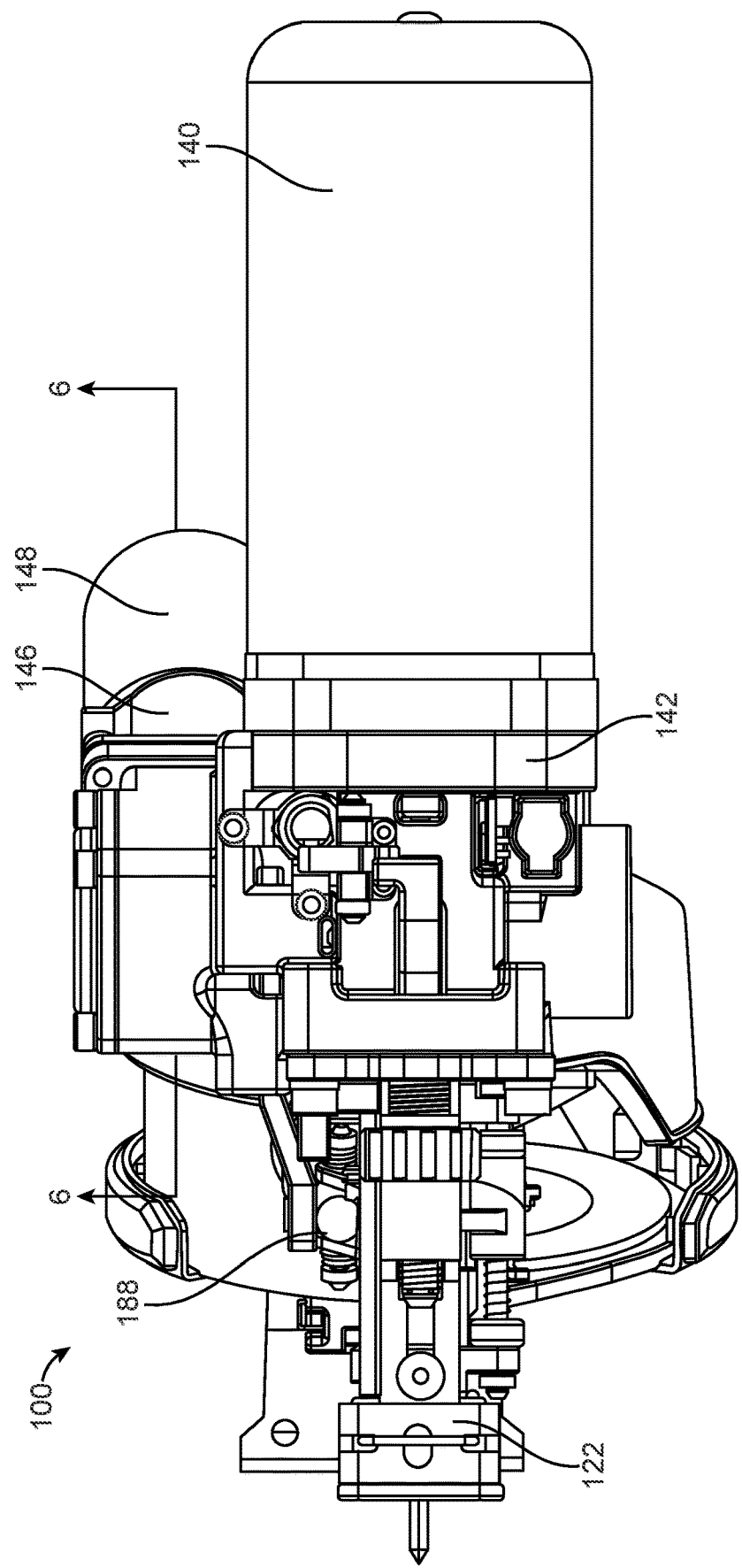
FIG. 4 is a top plan view of the gas-spring powered fastener driver of FIG. 1.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-6 illustrate an embodiment of a gas spring-powered fastener driver 100. The fastener driver 100 includes a housing 102 having a first housing shell 104 joined to a second housing shell 106. The housing 102 includes a head portion 108 having a handle portion 110 and a drive unit housing portion 112 attached thereto. The housing 102 also includes a battery receptacle portion 114 that extends from the handle portion 110 that is sized and shaped to receive a removable battery pack 116 there.

The fastener driver 100 further includes a fastener delivery portion 120 that extends along the drive unit housing portion 112 from a nosepiece 122 to a magazine receptacle portion 124 adjacent the drive unit housing portion 112. The magazine receptacle portion 124 is generally cylindrical and is sized and shaped to receive coiled fasteners therein. A magazine cover 126 is rotatably disposed on the housing 102 and provides access to a magazine 128 that may be removably disposed within the magazine receptacle portion 124. The magazine 128 is a canister magazine which contains a coiled strip of collated nails. Individual fasteners are sequentially loaded from the magazine 128 to the nosepiece 122 via the fastener delivery portion 120 during operation of the fastener driver 100.

As shown, the fastener driver 100 further includes a trigger 130 that extends outwardly from the handle portion 110 of the housing 102. In a particular aspect, the housing 102 of the fastener driver 100 includes one or more vent holes 132 formed in the first housing shell 104 and/or the second housing shell 106 to provide air flow to and from the interior of the housing 102 to help cool the internal electrical components housed therein.

As illustrated in FIGS. 2-6, the fastener driver 100 also includes several internal components. Specifically, the fastener driver 100 includes a storage chamber cylinder 140 disposed within the head portion 108 of the housing 102 and attached to a lifter housing 142. The lifter housing 142 includes an air fill valve 144 that is in fluid communication with the interior of the storage chamber cylinder 140. For example, the air fill valve 144 may be configured as a Schrader valve, a Presta valve, a Dunlop valve, or some other similar valve. When connected with a source of compressed gas, the air fill valve 144 enables the storage chamber cylinder 140 to be filled with compressed gas or refilled with compressed gas if any leakage occurs.

Figure 5:
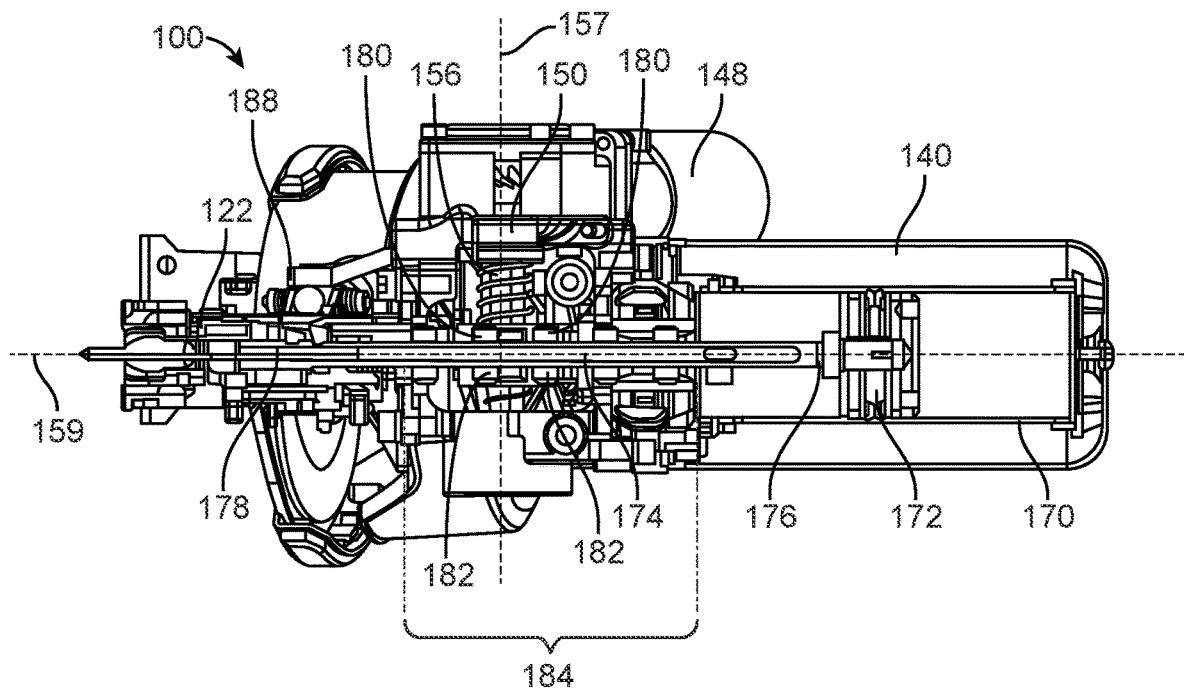
FIG. 5 is cross section view of the gas-spring powered fastener driver of FIG. 1 taken along Line 5-5 in FIG. 3.
Figure 6:
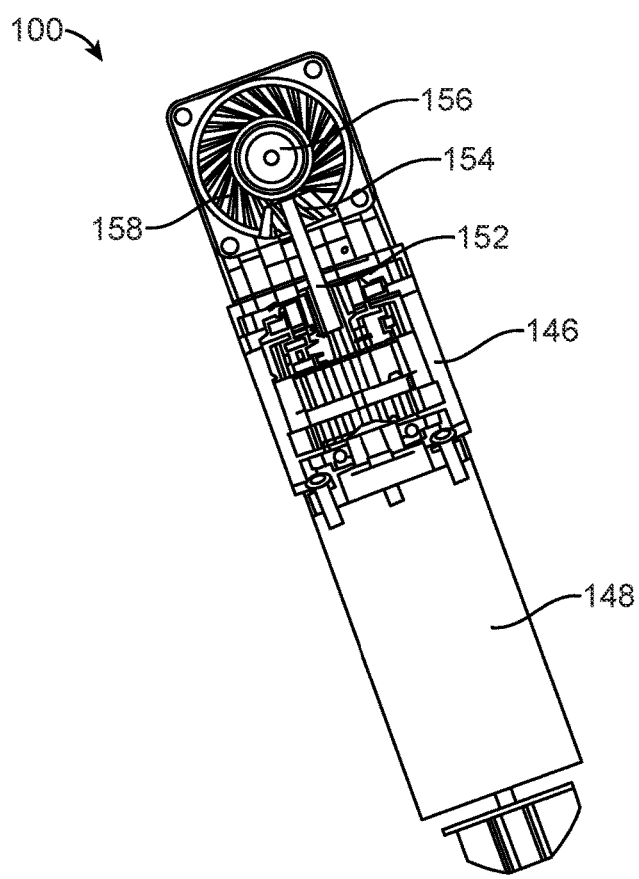
FIG. 6 is cross section view of the gas-spring powered fastener driver of FIG. 1 taken along Line 6-6 in FIG. 4.
Figure 7:
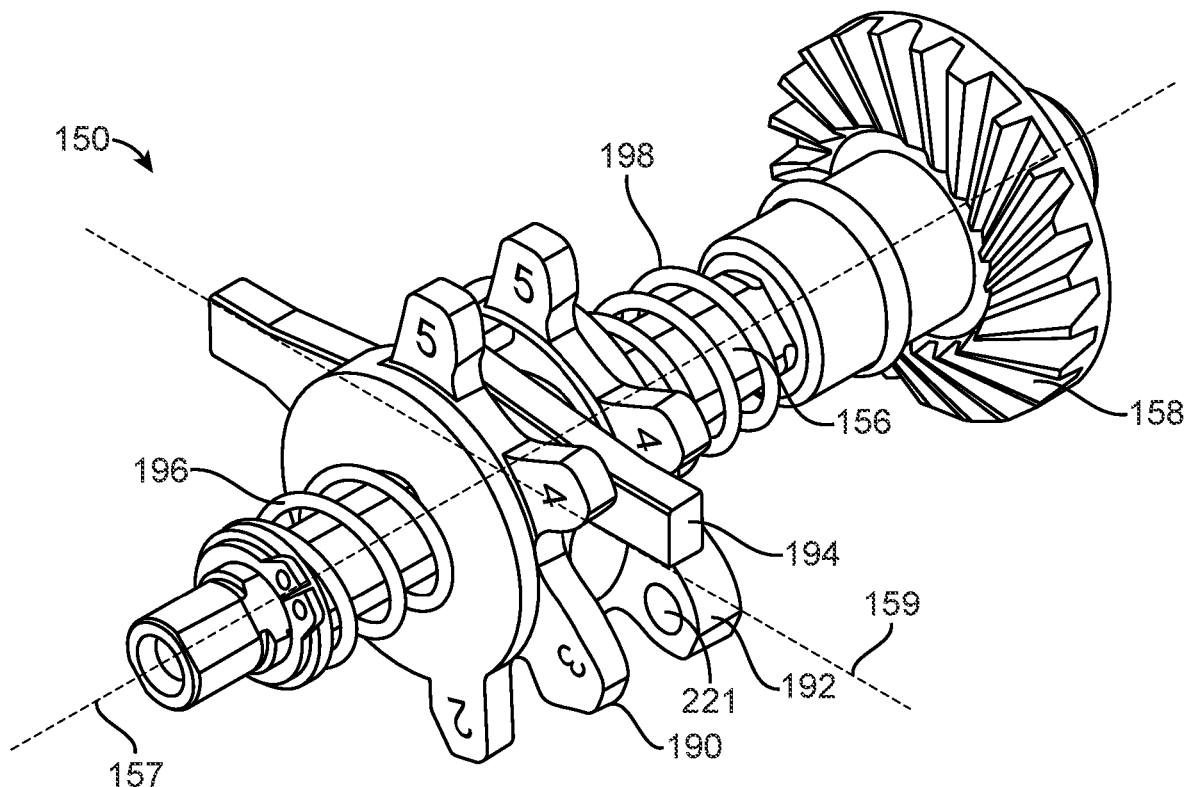
FIG. 7 is a perspective view of a lifter assembly for the gas-spring powered fastener driver of FIG. 1.

The fastener driver 100 further includes a transmission 146 coupled to the lifter housing 142. A motor 148 is coupled to the transmission 146. A lifter assembly 150 is rotatably disposed in the lifter housing 142 adjacent the storage chamber cylinder 140. During operation, the motor 148 drives the transmission 146 and the transmission 146 rotates the lifter assembly 150. Specifically, the transmission includes an output shaft 152 having a first bevel gear disposed thereon 154. The lifter assembly 150 includes a drive shaft 156 having a second bevel gear 158 disposed thereon. The second bevel gear 158 is meshed with the first bevel gear 154 at a right angle such that the output shaft 152 of the transmission 146 is perpendicular to the drive shaft 156 of the lifter assembly 150. As best depicted in FIG. 5, the drive shaft 156 extends along a drive shaft axis 157 that is perpendicular to a fastener delivery axis 159 of the fastener driver 100.

The fastener driver 100 includes a circuit board 160 that controls the operation of the fastener driver 100. A user interface 162 is connected to the circuit board 160 and extends through the housing 102 into an area near the handle portion 110. The user interface 162 provides the user controls for the fastener driver 100 and includes, for example, an on/off switch, a mode selector button, a remaining charge indicator, a charging indicator, and other additional buttons and indicators, as necessary. The circuit board 160 is electrically connected to the battery receptacle portion 114 and the removable battery pack 116 when engaged therewith and provides DC power to the motor 148 that is operably coupled to the lifter assembly 150 via the transmission 146 and the bevel gears 154, 158.

The storage chamber cylinder 140 includes a driver cylinder 170 disposed therein. Further, a moveable piston 172 is slidably disposed within the driver cylinder 170. A driver blade 174 is connected to the moveable piston 172 and moves back and forth along the fastener delivery axis 159 between a top-dead-center (TDC) (i.e., retracted or ready) position and a bottom-dead-center (BDC) (i.e., extended or driven) position. As shown, the driver blade 174 includes a proximal end 176 and a distal end 178. The proximal end 176 of the driver blade 174 is connected to the moveable piston 172 via a pin or other type of fastener. The driver blade 174 includes plurality of first posts 180 that extend from the driver blade 174 in a first direction perpendicular to the driver blade 174 and the fastener delivery axis 159 and a plurality of second posts 182 that extend from the driver blade 174 in a second direction perpendicular to the driver blade 174 and the fastener delivery axis 159 opposite the first direction. The first posts 180 and the second posts 182 may be fixed posts, in other words, they do not rotate in place. Conversely, the first posts 180 and the second posts 182 may include an outer bearing that rotates on a central post to facilitate smooth action of the driver blade 174 as it is returned to a TDC position by the lifter assembly 150.

In a particular aspect, as shown, there are five pairs of opposing (and laterally aligned) first and second posts 180, 182 that are equally spaced along a lifter engagement section 184 defined along a portion of the length of the driver blade 174. It is to be understood that the driver blade 174 may include more than five pairs of first and second posts 180, 182 or less than five pairs of first and second posts 180, 182 depending on the stroke length of the driver blade 174, the number of teeth on one or more lifter sprockets selectively engaged with the driver blade 174, or a combination thereof. As illustrated, the distal end 178 of the driver blade 174 is located adjacent the nosepiece 122 when the piston 172 is moved to a top-dead-center (TDC) (i.e., retracted or ready) position within the driver cylinder 170 and the fastener driver 100 is ready to be fired. Upon firing, the distal end 178 of the driver blade 174 is moved into the nosepiece 122 to drive a fastener from within the nosepiece 122 and into a workpiece until the piston 172 reaches a bottom-dead-center (BDC) (i.e., extended or driven) position within the driver cylinder 170.

The lifter assembly 150 selectively engages the driver blade 174 and the lifter assembly 150 is driven by the motor 148 to move the driver blade 174 from a fired position to a ready position and in the process move the piston 172 from the BDC position to the TDC position. As the lifter assembly 150 rotates, it also engages and actuates a fastener delivery mechanism 188 for the fastener driver 100 to load fasteners into the nosepiece 122 to be driven into a workpiece.

FIGS. 7-13 illustrate the details of the lifter assembly 150 and the components thereof. The lifter assembly 150 includes the drive shaft 156 having the second bevel gear 158 disposed thereon to rotate therewith. A first lifter sprocket 190 and a second lifter sprocket 192 are disposed on the drive shaft 156. The first lifter sprocket 190 is disposed on the drive shaft 156 on a first side of the driver blade 174, or the fastener delivery axis 159, and the second lifter sprocket 192 is disposed on the drive shaft 156 on a second side of the driver blade 174, or the fastener delivery axis 159, opposite the first side. The lifter sprockets 190, 192 are keyed to the drive shaft 156 and rotate therewith. Further, the lifter sprockets 190, 192 are slidable along the drive shaft 156, as described below. An actuator 194 is disposed between the lifter sprockets 190, 192. The actuator 194 is stationary, or fixed, relative to the drive shaft 156 and does not rotate. A first spring 196 is installed in compression adjacent the first lifter sprocket 190 and a second spring 198 is installed in compression adjacent the second lifter sprocket 190. The springs 196, 198 bias the lifter sprockets 190, 192 inward along the drive shaft 156 toward the actuator 194.

Figure 8:
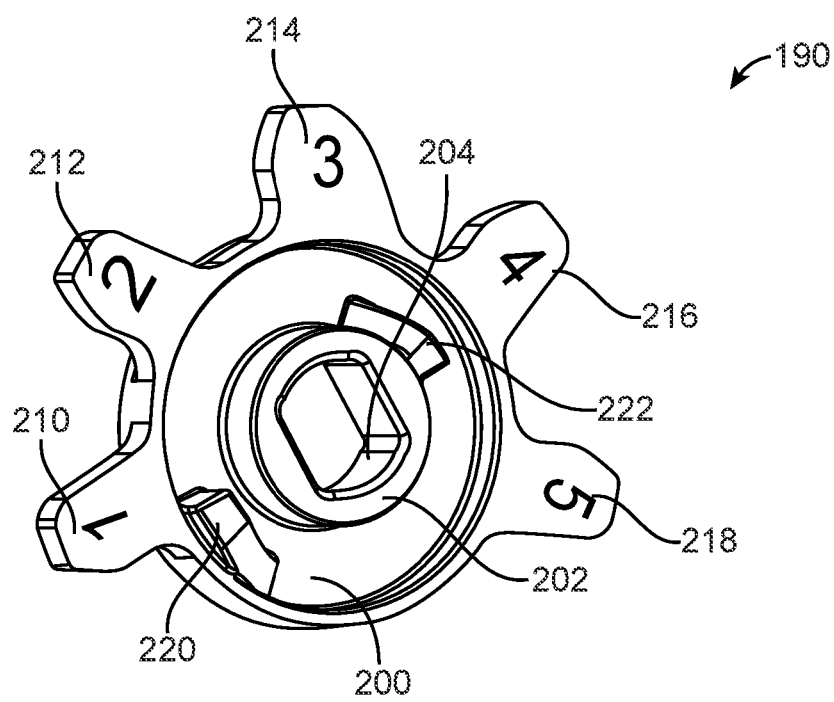
FIG. 8 is a perspective view of a lifter sprocket for the lifter assembly of FIG. 7.
Figure 9:
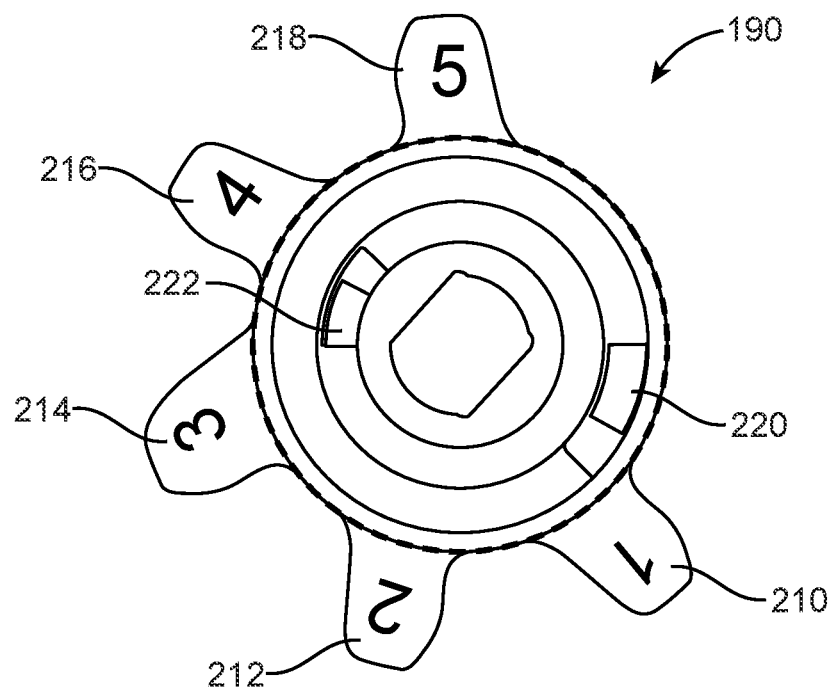
FIG. 9 is a side plan view of the lifter sprocket of FIG. 8.
Figure 10:
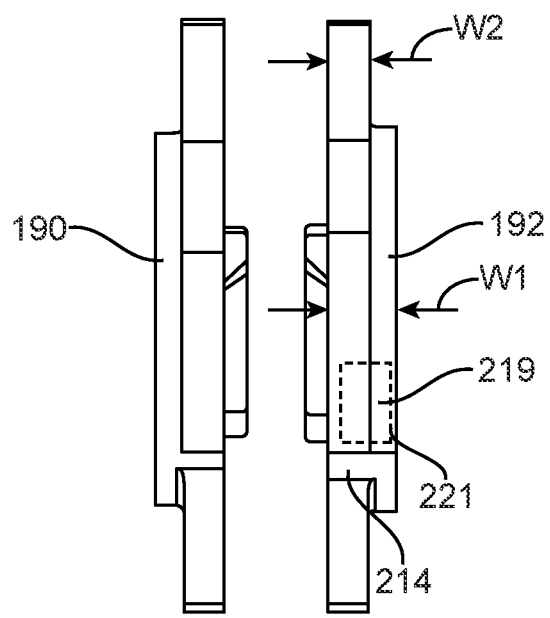
FIG. 10 is a rear plan view of a pair of lifter sprockets for the lifter assembly of FIG. 7.

FIGS. 8-10 show the details of the lifter sprockets 190, 192. As illustrated in FIG. 8, the first lifter sprocket 190 includes a disc shaped body 200 that includes a central hub 202 formed with a central bore 204 that is keyed to the drive shaft 156 of the lifter assembly 150 to allow the first lifter sprocket 190 to rotate with the drive shaft 156. As shown, the first lifter sprocket 190 includes a first lifter tooth 210, a second lifter tooth 212, a third lifter tooth 214, a fourth lifter tooth 216, and a fifth lifter tooth 218 that extend radially outward from the body 200 of the first lifter sprocket 190. As best shown in FIG. 9, the first lifter tooth 210, the second lifter tooth 212, the fourth lifter tooth 216, and the fifth lifter tooth 218 are identically sized and shaped with each other. The third lifter tooth 214, however, is differently sized and shaped from the first lifter tooth 210, the second lifter tooth 212, the fourth lifter tooth 216, and the fifth lifter tooth 218.

Specifically, the third lifter tooth 214 has a tooth area A3 measured from the outer periphery of the disc shaped body 200 (indicated by the dashed circle) to the outer wall of the third lifter tooth 214 that is greater than the tooth area A of each of the other lifter teeth 210, 212, 216, 218. For example, the area A3 is greater than or equal to 1.100 times the area A. Further, the area A3 is greater than or equal to 1.125 times the area A, such as greater than or equal to 1.150 times the area A, greater than or equal to 1.175 times the area A, greater than or equal to 1.200 times the area A, greater than or equal to 1.225 times the area A, or greater than or equal to 1.250 times the area A. In another aspect, the area A3 is less than or equal to 1.400 times the area A, such as less than or equal to 1.375 times the area A, less than or equal to 1.350 times the area A, less than or equal to 1.325 times the area A, less than or equal to 1.300 times the area A, or less than or equal to 1.275 times the area A. In another aspect, the area A3 is equal to 1.26 times the area A. It is to be understood that the area A3 can be within a range between, and including, any of the maximum and minimum values of A3 described herein. It is further to be understood that the increased size of the third lifter tooth 214 relative to the first lifter tooth 210, the second lifter tooth 212, the fourth lifter tooth 216, and the fifth lifter tooth 218 allows a magnet 219 to be disposed within the third lifter tooth 214 of the second lifter sprocket 192. The magnet 219 is detected by a sensor, e.g., a Hall sensor to determine a position of the lifter assembly 150 during operation of the fastener driver 100. The magnet 219 is disposed within a bore 221 formed in the third lifter tooth 214 of the second lifter sprocket 192.

To further accommodate the magnet 219 within the third lifter tooth 214 of the second lifter sprocket 192, the third lifter tooth 214 of the second lifter sprocket 192 is wider than the first lifter tooth 210, the second lifter tooth 212, the fourth lifter tooth 216, and the fifth lifter tooth 218 of the second lifter sprocket 192. In particular, the third lifter tooth 214 of the second lifter sprocket 192 has a first width W1, while the first lifter tooth 210, the second lifter tooth 212, the fourth lifter tooth 216, and the fifth lifter tooth 218 of the second lifter sprocket 192 have a second width W2. The first width W1 is greater than the second width W2. In a particular aspect, the first width W1 is greater than or equal to 1.3 times the second width W2, such as greater than or equal to 1.4 times the second width W2, greater than or equal to 1.5 times the second width W2, or greater than or equal to 1.6 times the second width W2. In another aspect, the first width W1 is less than or equal to 2.0 times the second width W2, such as less than or equal to 1.9 times the second width W2, less than or equal to 1.8 times the second width W2, or less than or equal to 1.7 times the second width W2. It is to be understood that the first width W1 may be within a range between, and including, any of the minimum and maximum values of W1 disclosed herein. It is to be further understood that all of the lifter teeth 210, 212, 214, 216, 218 on the first lifter sprocket 190 have the same width and that width is substantially the same as the second width W2.

As further shown, the first lifter sprocket 190 includes an outer lifter ramp 220 adjacent the outer periphery of the disc shaped body 200 and an inner lifter ramp 222 adjacent and contiguous with the central hub 202 of the first lifter sprocket 190.

Figure 11:
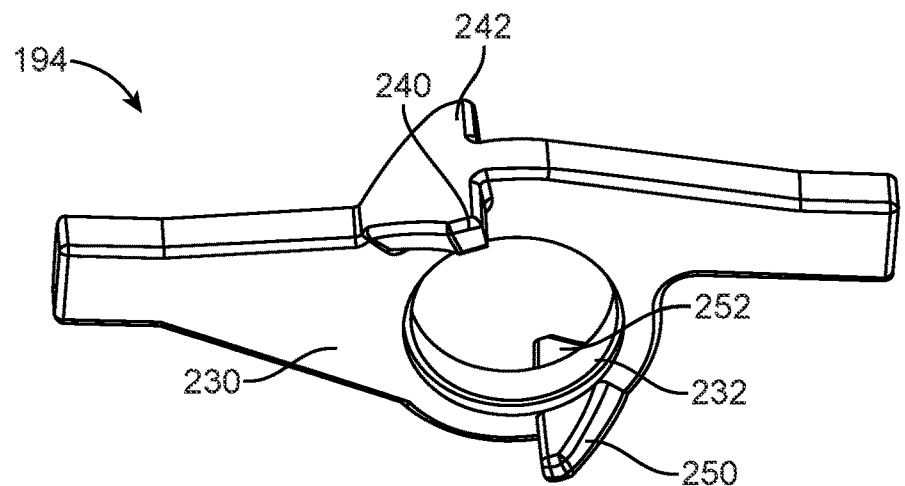
FIG. 11 is a perspective view of an actuator for the lifter assembly of FIG. 7.
Figure 12:
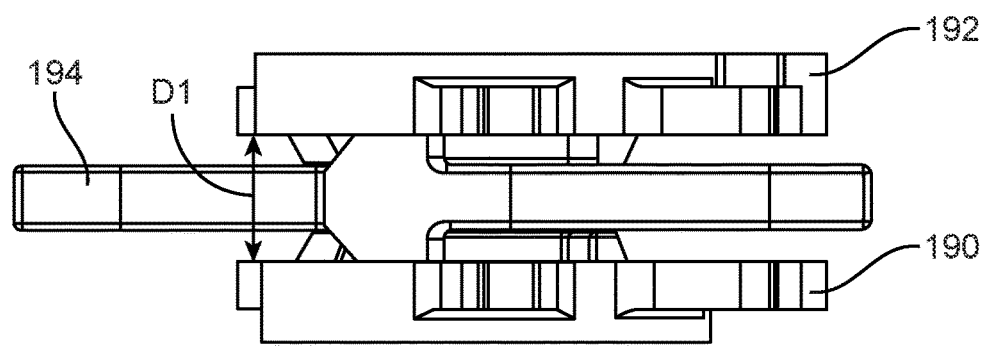
FIG. 12 is a top view of the pair of lifter sprockets of FIG. 10 flanking the actuator of FIG. 11 in a first position.
Figure 13:
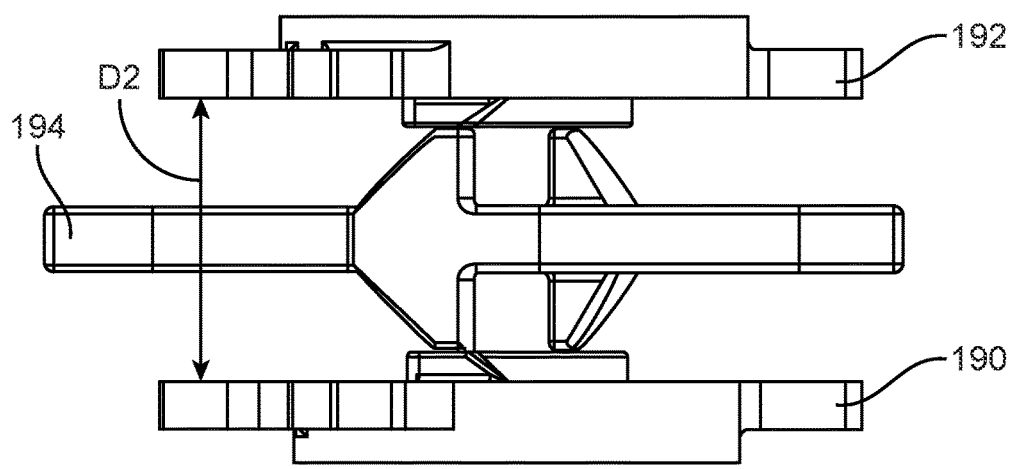
FIG. 13 is a top view of the pair of lifter sprockets of FIG. 10 flanking the actuator of FIG. 11 in a second position.
Figure 14:
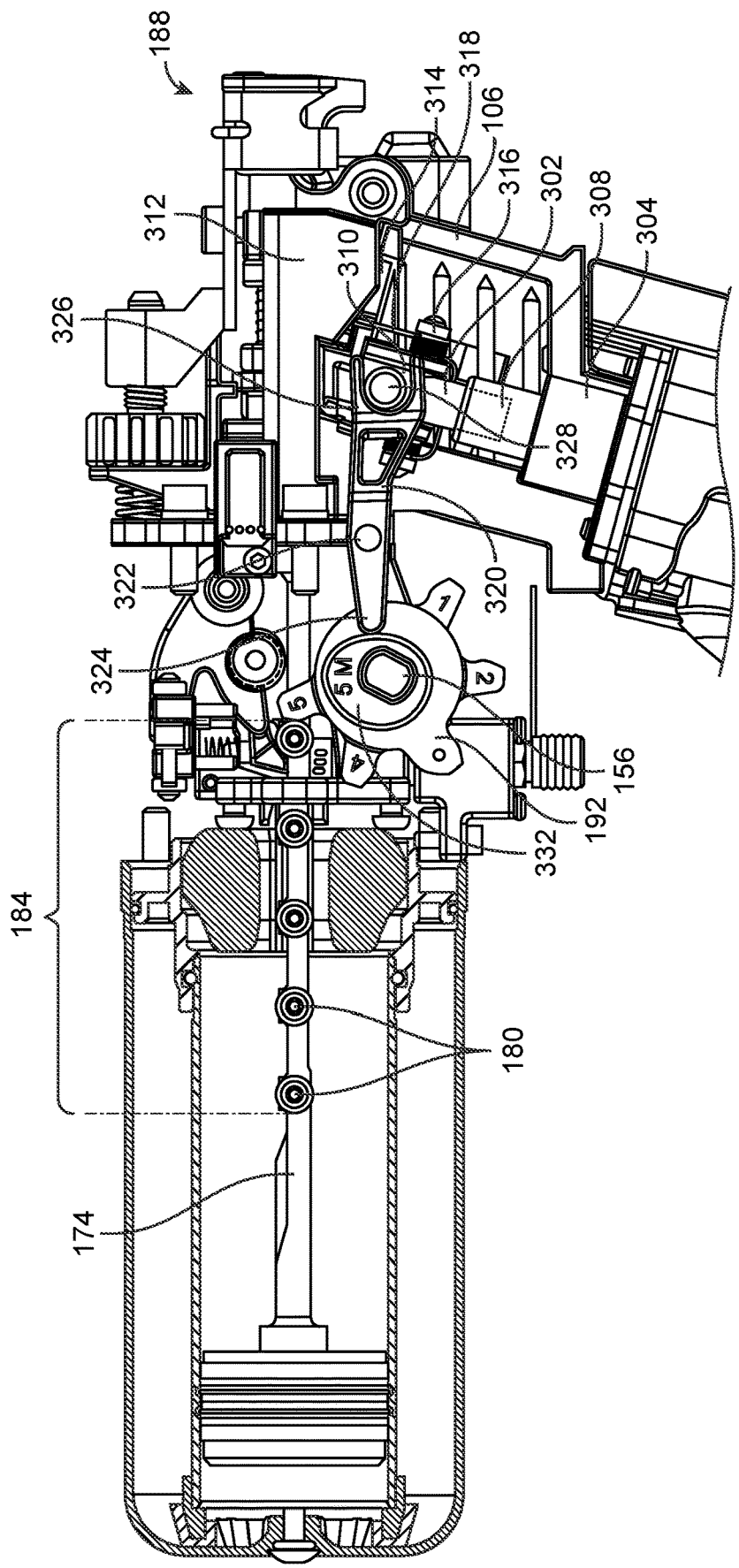
FIG. 14 is a plan view of a fastener delivery mechanism for the gas-spring powered fastener driver of FIG. 1.

FIG. 11 shows that the actuator 194 includes an elongated body 230 formed with a central bore 232. The drive shaft 156 extends through the central bore 232 of the actuator 194. The actuator 194 is held in a stationary position between the first lifter sprocket 190 and the second lifter sprocket 192 and does not rotate with the drive shaft 156 or translate on the drive shaft 156 relative to the first lifter sprocket 190 and the second lifter sprocket 192. The actuator 194 includes a first outer actuator ramp 240 and a second outer actuator ramp 242 adjacent the outer periphery of the elongated body 230. The first and second outer actuator ramps 240, 242 are aligned with each other and are located on opposite sides of the elongated body 230 of the actuator 194. The actuator 194 further includes a first inner actuator ramp 250 and a second inner actuator ramp 252 adjacent the central bore 232 of the elongated body 230. The first and second inner actuator ramps 250, 252 are aligned with each other and are located on opposite sides of the elongated body 230 of the actuator 194. Moreover, the outer actuator ramps 240, 242 are diametrically opposed to the inner actuator ramps 250, 252.

During the operation of the fastener driver 100, the outer lifter ramps 220 of the lifter sprockets 190, 192 engage the outer actuator ramps 240, 242 on the actuator 194 and the inner lifter ramps 222 of the lifter sprockets 190, 192 engage the inner actuator ramps 250, 252 on the actuator 194. As the lifter assembly 150 rotates, the teeth on the lifter sprockets 190, 192 engage posts on the driver blade 174 to move the driver blade 174 to the TDC position. As the lifter ramps 220, 222 engage the actuator ramps 240, 242, 250, 252, the lifter sprockets 190, 192 are driven outward along the drive shaft 156 away from the actuator 194 to clear the driver blade 174 before engaging the driver blade 174 to start the lifting sequence. Then, the springs 196, 198 bias the lifter sprockets 190, 192 inward along the drive shaft 156 back toward the actuator 194. As such, the lifter sprockets 190, 192 move between a first position, shown in FIG. 12, in which the sprockets 190, 192 are spaced apart a first distance D1 and the driver blade 174 is engaged and a second position, shown in FIG. 13, in which the sprockets 190, 192 are spaced apart a second distance D2 and the driver blade 174 is cleared before re-engagement.

In a particular aspect, the second distance D2 is greater than the first distance D1. Specifically, D2 is greater than or equal to 1.50 times the first distance D1, such as, greater than or equal to 1.75 times the first distance D1, greater than or equal to 2.00 times the first distance D1, or greater than or equal to 2.25 times the first distance D1. In another aspect, the second distance D2 is less than or equal to 3.50 times the first distance D1, such as less than or equal to 3.25 times the first distance D1, less than or equal to 3.00 times the first distance D1, less than or equal to 2.75 times the first distance D1, or less than or equal to 2.50 times the first distance D1. It is to be understood that the second distance D2 may be with a range between, and including, any of the minimum and maximum values of the second distance D2 described herein.

FIGS. 14-18 illustrate the details of the fastener delivery mechanism 188 for the fastener driver 100. As shown, the fastener delivery mechanism 188 includes a spring-loaded advancer support post 302 that is slidably disposed within a bracket 304 on the nosepiece 122 adjacent the magazine receptacle portion 124, or extending partially into the magazine receptacle portion 124. The advancer support post 302 includes a proximal end 308 and a distal end 310. A spring is installed in compression adjacent the proximal end 308 of the advancer support post 302 to bias the advancer support post 302 toward a barrel 312 of the nosepiece 122. An advancer 314 is mounted on the distal end 310 of the advancer support post 302 via a hinge pin 316. A torsional spring 318 is disposed on the hinge pin 316 to bias the advancer 314 around the hinge pin 316 toward the nosepiece 122.

The fastener delivery mechanism 188 further includes a rocker arm 320 rotatably mounted on the nosepiece 122 or a lifter housing 142 (not illustrated in FIGS. 14-18 for clarity) via a post 322 (e.g., a threaded fastener, a hardened pin, or similar fastener). The rocker arm 320 includes a rounded proximal end 324 and a forked distal end 326 that fits around a lateral post 328 on the distal end 310 of the advancer support post 302. As shown, the fastener delivery mechanism 188 includes a cam 332 disposed on the drive shaft 156 adjacent the second lifter sprocket 192. The cam 332 selectively engages the rounded proximal end 324 of the rocker arm 320 so that the rounded proximal end 324 of the rocker arm 320 acts as a cam follower. As previously described, the lifter sprocket 192 is part of the lifter assembly 150 that rotates to return a driver blade 174 to a top-dead-center (TDC) (i.e., retracted or ready) position during operation of the fastener driver 100 in which the fastener delivery mechanism 188 is installed.

Figure 15:
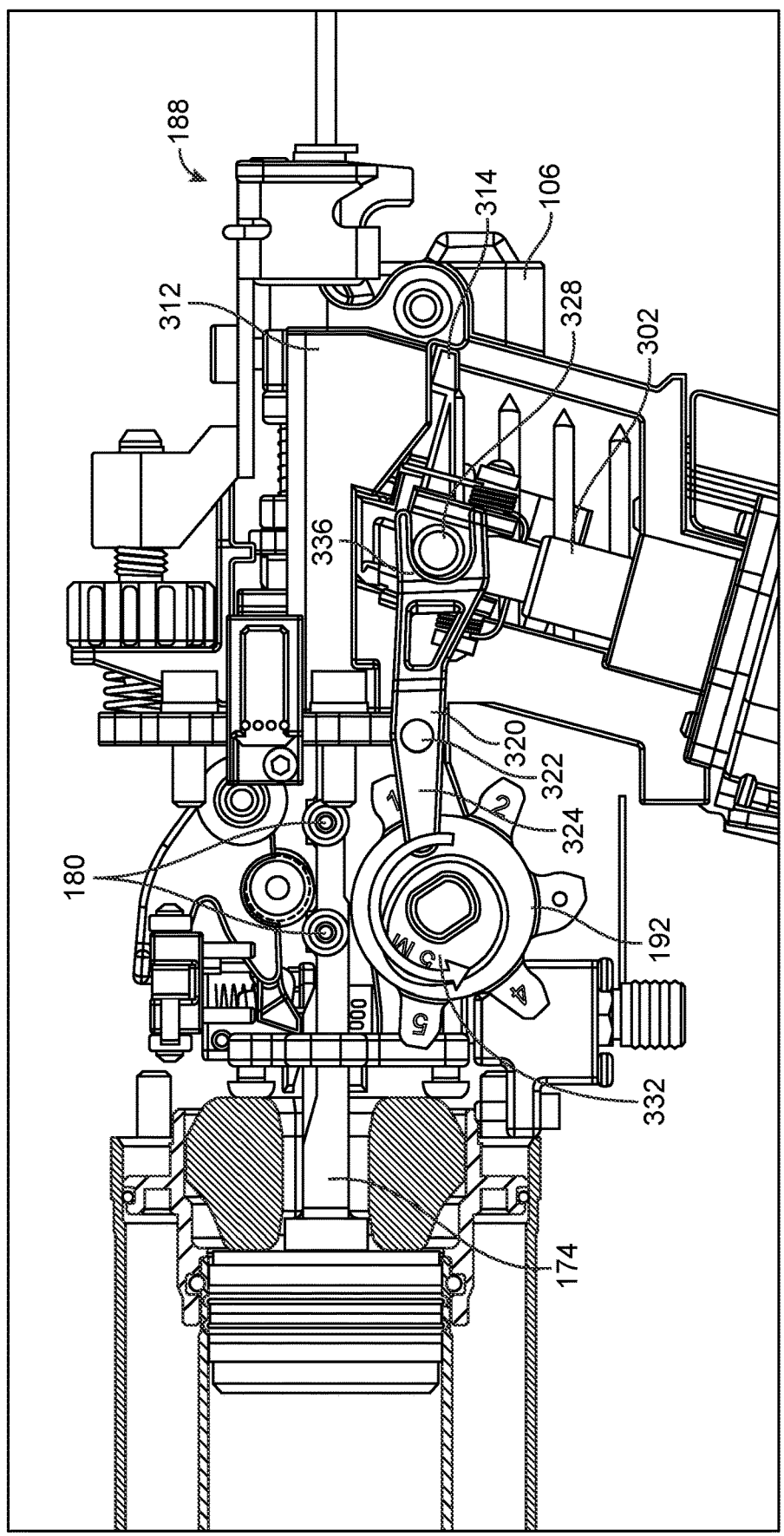
FIG. 15 is another plan view of the fastener delivery mechanism of FIG. 14.
Figure 16:
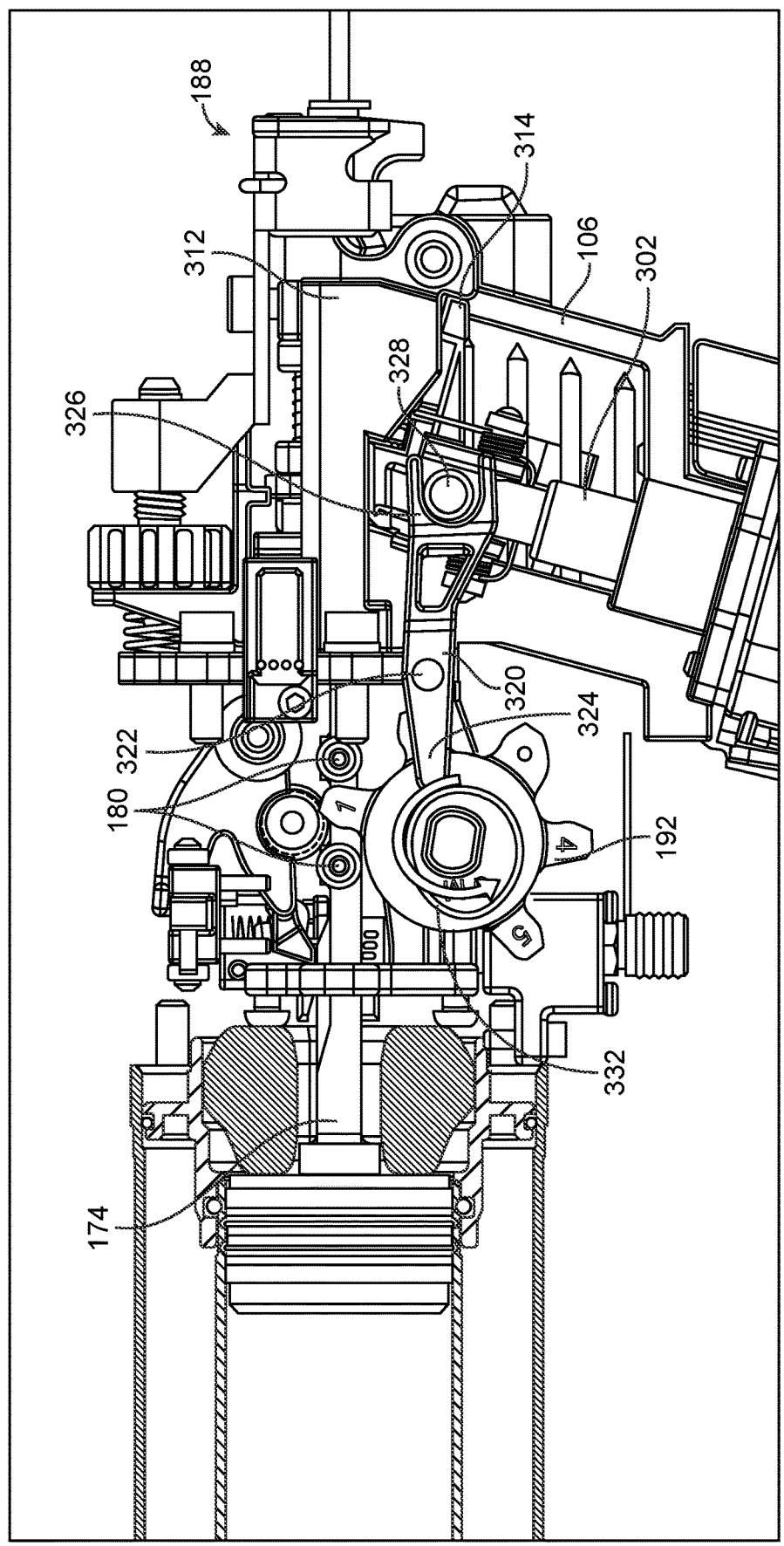
FIG. 16 is yet another plan view of the fastener delivery mechanism of FIG. 14.
Figure 17:
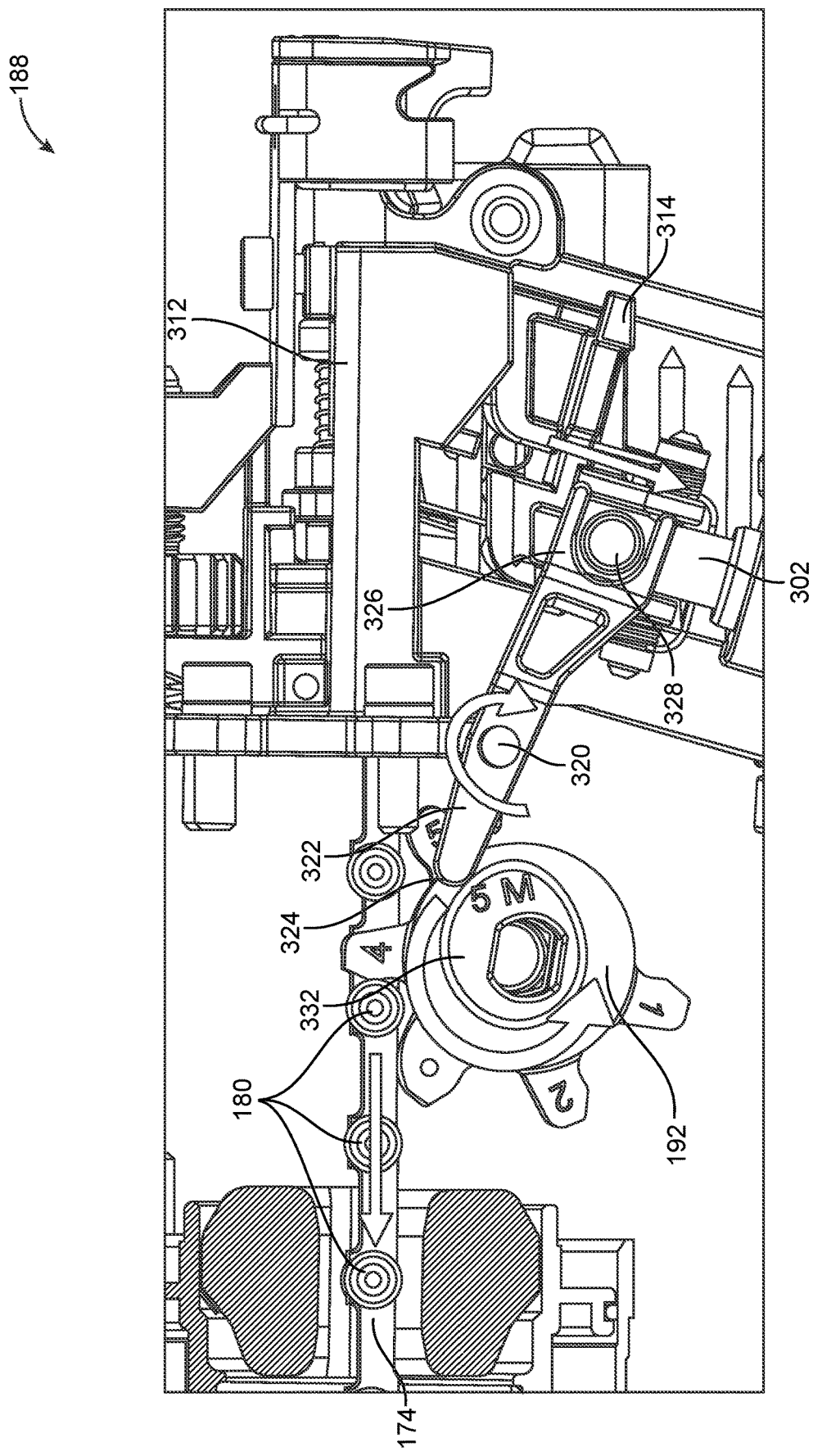
FIG. 17 is still another plan view of the fastener delivery mechanism of FIG. 14.
Figure 18:
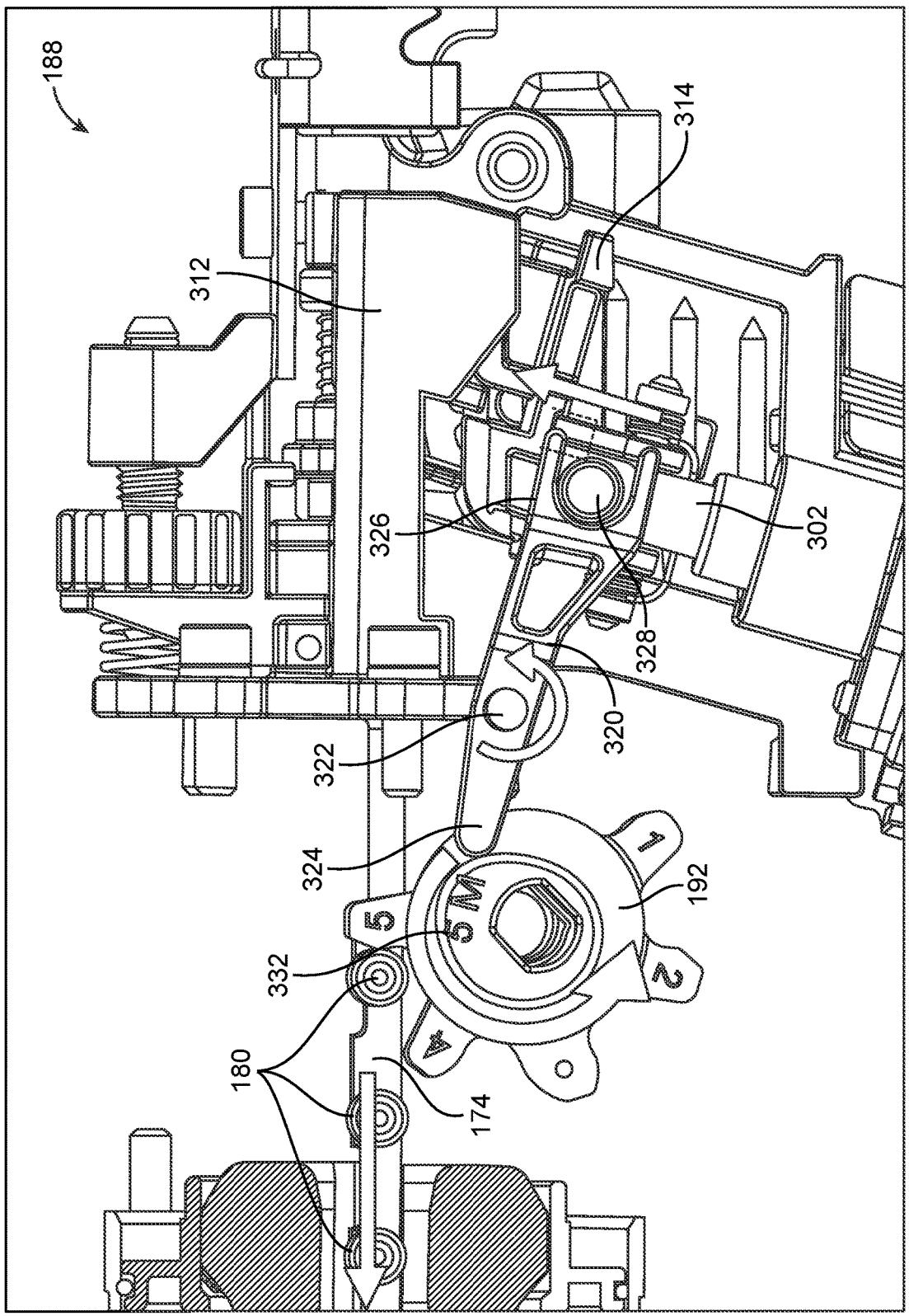
FIG. 18 is yet still another plan view of the fastener delivery mechanism of FIG. 14.

When the driver blade 174 is fired, or moved to a bottom-dead-center (BDC) (i.e., extended or driven) position, the driver blade 174 moves into the barrel 312 of the nosepiece 122 to drive a fastener therefrom. Initially, when the driver blade 174 is fired, as depicted in FIG. 15, the cam 332 does not engage the rounded proximal end 324 of the rocker arm 320. Thereafter, as the lifter sprocket 192 rotates, counterclockwise, as shown in FIGS. 15-18, the cam 332 engages the rounded proximal end 324 of the rocker arm 320 and pushes the rounded proximal end 324 of the rocker arm 320 up to rotate the rocker arm 320 clockwise about the post 322 and move the forked distal end 326 in a downward direction away from the nosepiece 122. As the forked distal end 326 moves in the downward direction, the advancer 314 moves down along the collated fasteners to engage the next ready fastener, as shown in FIG. 17.

Prior to the lifter sprocket 192 stopping at the end of the firing sequence and the driver blade 174 is returned to the TDC (i.e., retracted or ready) position, the rounded proximal end 324 of the rocker arm 320 clears the cam 332 and moves past the cam 332 while the advancer support post 302 is biased to the ready position and moves the advancer 314 up to deliver the next fastener into the barrel 312 of the nosepiece 122.

Figure 19:
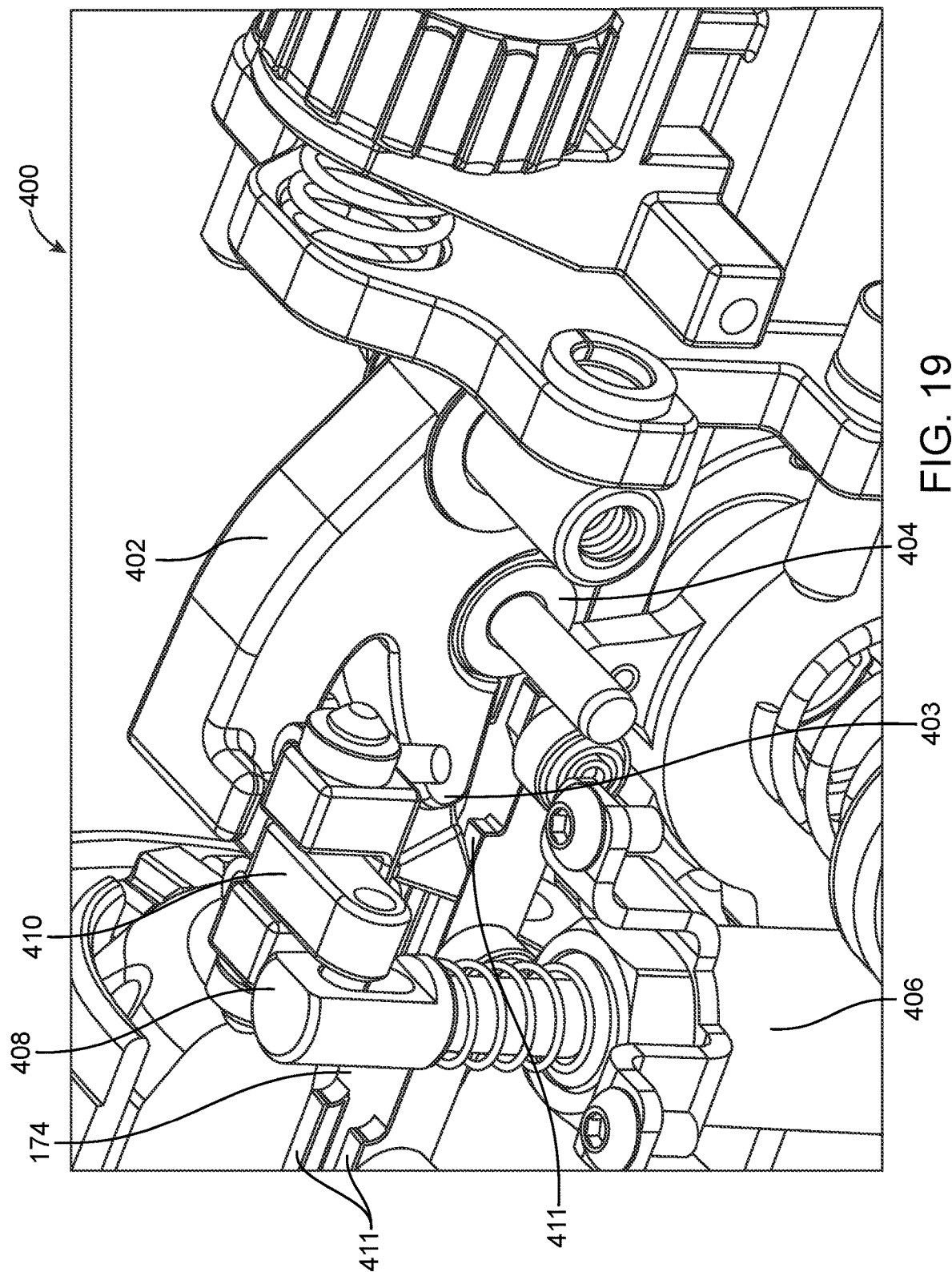
FIG. 19 is a perspective view of a safety latch assembly for the gas-spring powered fastener driver of FIG. 1.
Figure 20:
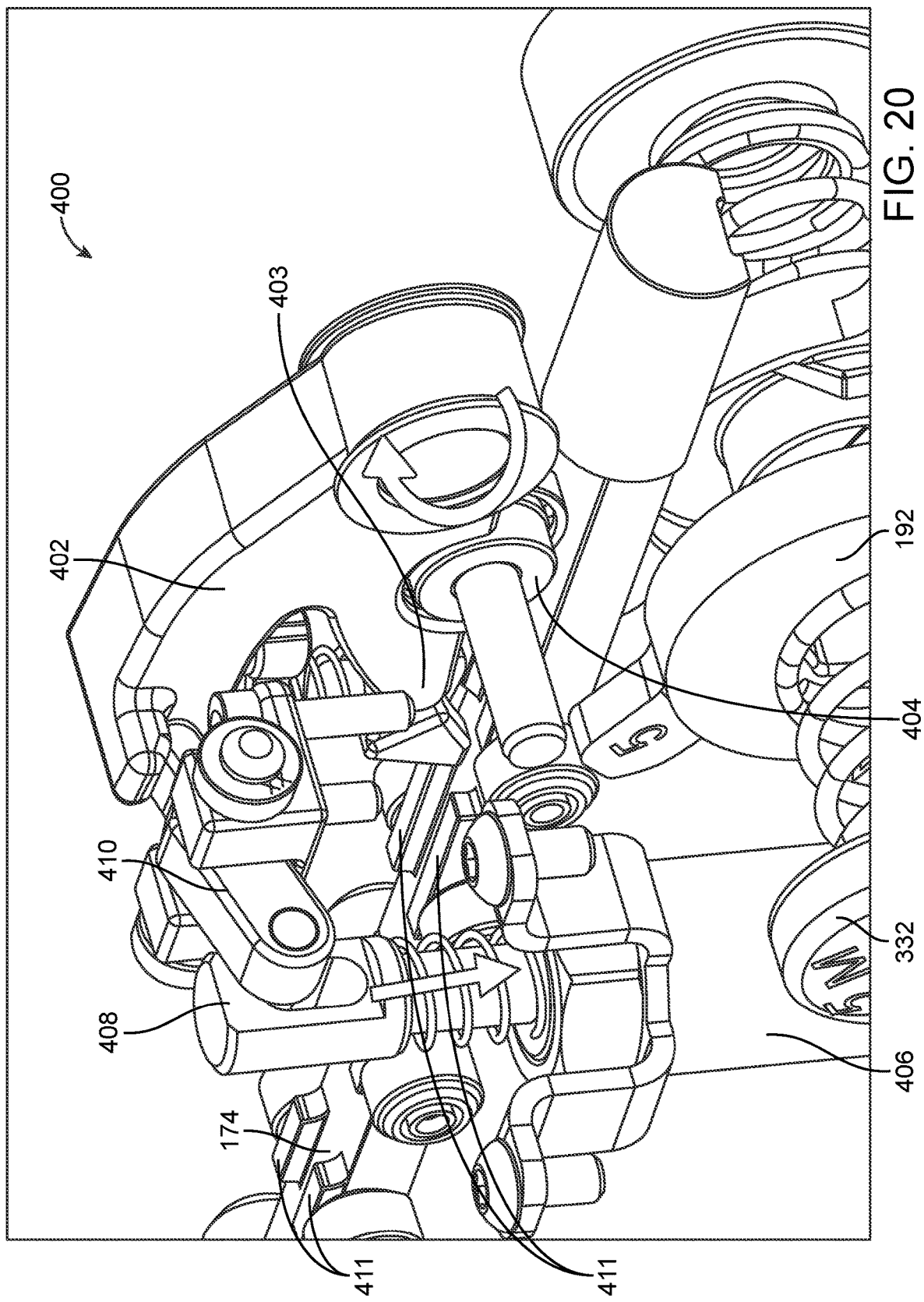
FIG. 20 is another perspective view of the safety latch assembly of FIG. 19.
Figure 21:
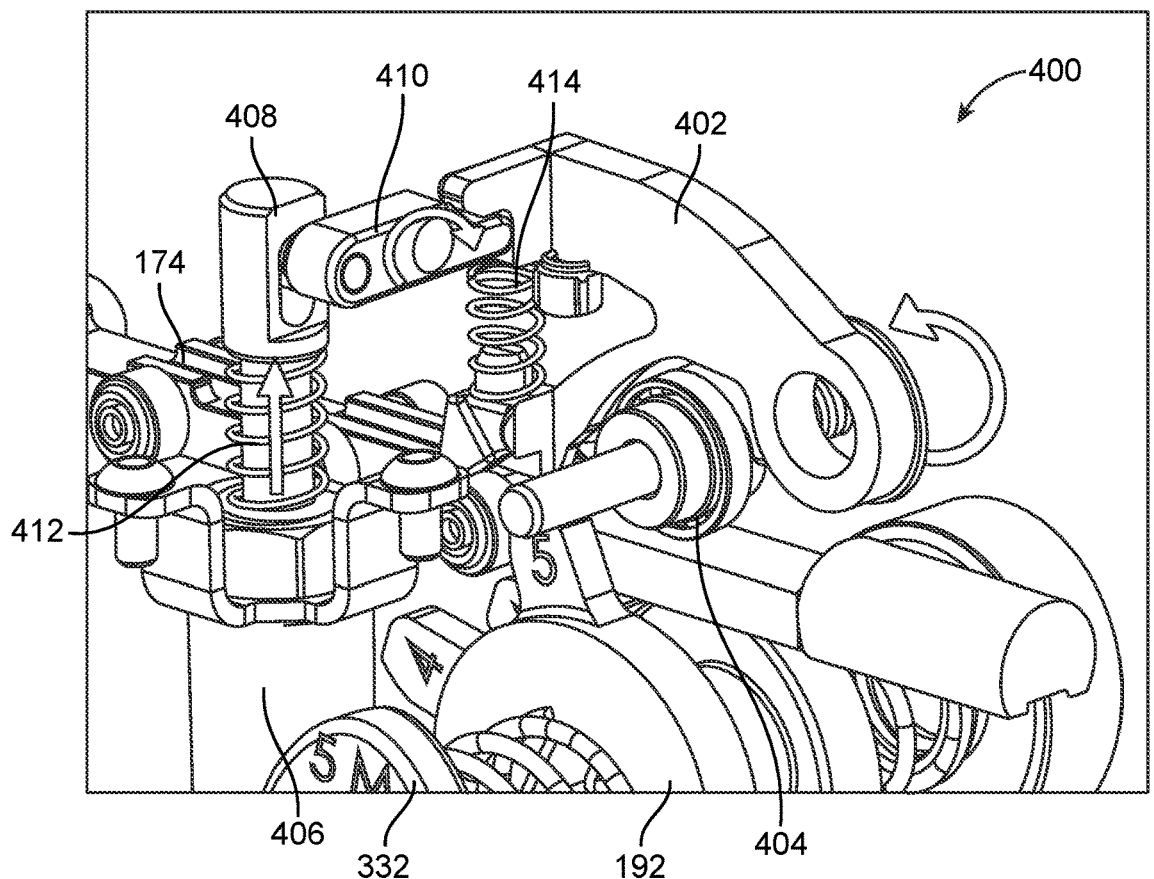
FIG. 21 is yet another perspective view of the safety latch assembly of FIG. 19.

FIGS. 19-20 depict a safety latch assembly 400, the safety latch assembly 400 includes a latch 402 having a nose 403 and a driver blade support roller 404 disposed thereon. The driver blade support roller 404 contacts the driver blade 174 when the nose of the latch 402 is disengaged from the driver blade 174, as described below, and provides support for the driver blade 174 as it moves back and forth between the TDC position and the BDC position to maintain the driver blade 174 in proper alignment within the powered fastener driver 100. A solenoid 406 having a plunger 408 is coupled to the latch 402 via a latch actuation lever 410. As shown in FIG. 20, when the solenoid 406 is energized, the plunger 408 moves down into the solenoid 406 to pivot the latch actuation lever 410 up and in turn, also pivot the nose 403 of latch 402 to a position clear of one or more teeth 411 on the driver blade 174 so the nose 403 of the latch 402 does not interfere with the movement of the driver blade 174 as it moves to the BDC position. When the solenoid 406 is de-energized a first spring 412 returns the plunger 408 to a ready position while a second spring 414 returns the nose 403 of the latch 402 to a ready position (FIG. 21) to engage the one or more teeth 411 to block movement of the driver blade 174 toward the BDC position.

Figure 22:
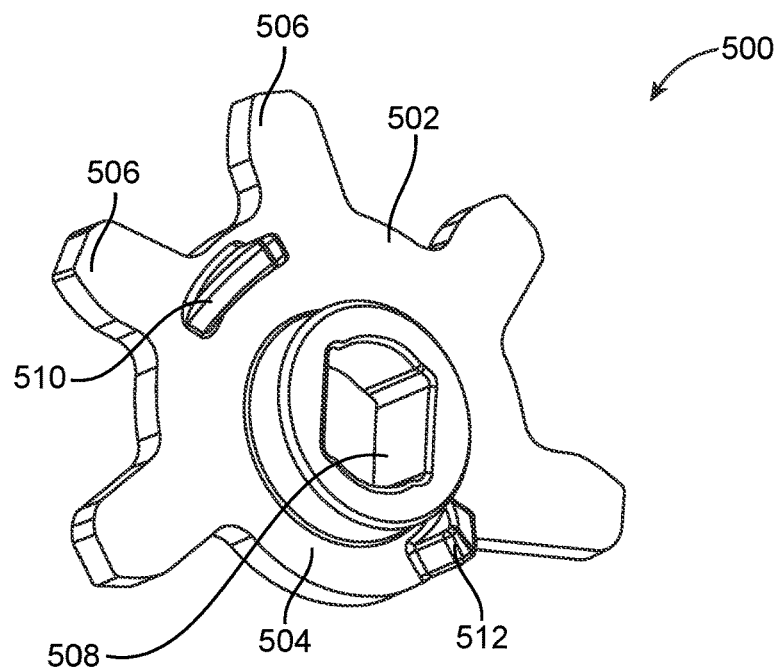
FIG. 22 is a perspective view of another lifter sprocket for the gas-spring powered fastener driver of FIG. 1.

FIG. 22 depicts another embodiment of a lifter sprocket 500 that may be paired with a similarly constructed lifter sprocket and installed within the lifter assembly 150. The lifter sprocket 500 includes a body 502 having a central hub 504 from which a plurality of lifter teeth 506 extending radially outward from the central hub 504. The body 502 includes a central bore 508 that is keyed to the drive shaft 156 to prevent the lifter sprocket 500 from rotating on the drive shaft 156. The lifter sprocket 500 further includes an outer lifter ramp 510 adjacent an outer periphery of the body 502 and an inner lifter ramp 512 adjacent and spaced apart from the central hub 504. The lifter ramps 510, 512 cooperate with actuator ramps 240, 242, 250, 252, as described herein, to push a pair of opposing lifter sprockets 500 axially along the drive shaft 156 against springs 196, 198 to clear the lifter sprockets 500 from the driver blade 174 before engaging the driver blade 174 to start the lifting sequence.

Although the disclosure has been described in detail with reference to certain preferred embodiments, variations and modifications exist within the scope and spirit of one or more independent aspects of the disclosure as described.

Various features of the invention are set forth in the following claims. When used in this specification and claims, the terms "comprises" and "comprising" and variations thereof mean that the specified features, steps or integers are included. The terms are not to be interpreted to exclude the presence of other features, steps or components.

What is claimed is:

1. A powered fastener driver comprising:
   a housing;
   a nosepiece extending from the housing;
   a driver blade movable within the nosepiece between a top-dead-center (TDC) position and a bottom-dead-center (BDC) position;
   a piston coupled to the driver blade for movement therewith;
   a driver cylinder within which the piston is movable and in fluid communication with a pressurized gas acting on the piston;
   a magazine coupled to the nosepiece in which collated fasteners are receivable;
   a fastener delivery mechanism for loading individual fasteners into the nosepiece from the magazine; and
   a lifter assembly including
      a lifter housing;
      a drive shaft rotatably disposed within the lifter housing;
      a lifter sprocket disposed on the drive shaft for moving the driver blade from the BDC position toward the TDC position; and
      a cam coaxial with the drive shaft and rotatable in response to rotation of the drive shaft for actuating the fastener delivery mechanism.

2. The powered fastener driver of claim 1, wherein the fastener delivery mechanism comprises a spring-loaded advancer support post slidably disposed within a bracket at least partially disposed on the nosepiece.

3. The powered fastener driver of claim 2, wherein the fastener delivery mechanism further comprises an advancer disposed on an end of the advancer support post.

4. The powered fastener driver of claim 3, wherein the advancer moves along a group of collated fasteners to load individual fasteners from the group of collated fasteners into the nosepiece one at a time.

5. The powered fastener driver of claim 3, wherein the fastener delivery mechanism further comprises a rocker arm having a proximal end that follows the cam.

6. The powered fastener driver of claim 5, wherein the rocker arm includes a forked distal end that fits around and engages a lateral post on the advancer support post.

7. The powered fastener driver of claim 6, wherein, as the rocker arm is rotated by the cam, the forked distal end moves the advancer support post into the bracket and moves the advancer along the group of collated fasteners to engage a next fastener from the group of collated fasteners.

8. The powered fastener driver of claim 7, wherein, in response to continued rotation of the cam, the distal end of the rocker arm moves past the cam and the advancer support post is biased to a ready position to move the advancer toward the nosepiece to deliver the next fastener into the nosepiece.

9. A powered fastener driver comprising:
   a housing;
   a nosepiece extending from the housing;
   a driver blade a first side, a second side opposite the first side, and a plurality of posts extending laterally from the first side, the driver blade movable within the nosepiece between a top-dead-center (TDC) position and a bottom-dead-center (BDC) position along a fastener delivery axis;
   a piston coupled to the driver blade for movement therewith;
   a driver cylinder within which the piston is movable and in fluid communication with a pressurized gas acting on the piston;
   a magazine coupled to the nosepiece in which collated fasteners are receivable;
   a lifter assembly for moving the driver blade from the BDC position toward the TDC position, the lifter assembly including
      a drive shaft defining a drive shaft axis that extends from the first side of the driver blade to the second side of the driver blade; and
      a cam rotatable about the drive shaft axis in response to rotation of the drive shaft; and
   a fastener delivery mechanism actuated by the cam to load individual fasteners into the nosepiece from the magazine, the fastener delivery mechanism including a rocker arm having a rounded proximal end that follows the cam.

10. The powered fastener driver of claim 9, wherein the rocker arm further includes a distal end and an advancer support post is engaged with the distal end of the rocker arm.

11. The powered fastener driver of claim 10, wherein the fastener delivery mechanism further includes an advancer disposed on the advancer support post.

12. The powered fastener driver of claim 11, wherein the advancer moves away from the nosepiece as the rocker arm is driven by the cam.

13. The powered fastener driver of claim 12, wherein the advancer moves along a group of collated fasteners to load individual fasteners from the group of collated fasteners into the nosepiece one at a time.

14. The powered fastener driver of claim 11, wherein the rocker arm is rotated by the cam to move the advancer along the group of collated fasteners to engage a next fastener from the group of collated fasteners.

15. The powered fastener driver of claim 14, wherein in response to continued rotation of the cam, the rocker arm moves past the cam and the advancer is biased toward the nosepiece to deliver the next fastener into the nosepiece.

16. A powered fastener driver comprising:
    a housing;
    a nosepiece extending from the housing;
    a driver blade movable within the nosepiece between a top-dead-center (TDC) position and a bottom-dead-center (BDC) position;
    a piston coupled to the driver blade for movement therewith;
    a driver cylinder within which the piston is movable and in fluid communication with a pressurized gas acting on the piston;
    a magazine coupled to the nosepiece in which collated fasteners are receivable;
    a lifter assembly including
        a lifter housing;
        a drive shaft rotatably disposed within the lifter housing;
        a first lifter sprocket disposed on the drive shaft to move the driver blade from the BDC position toward the TDC position; and
        a cam disposed on the drive shaft and rotatable in response to rotation of the drive shaft; and
    a fastener delivery mechanism actuated by the cam to load individual fasteners into the nosepiece from the magazine, the fastener delivery mechanism including
        a rocker arm driven by the cam; and
        an advancer movable by the rocker arm.

17. The powered fastener driver of claim 16, wherein the advancer moves away from the nosepiece as the rocker arm is driven by the cam.

18. The powered fastener driver of claim 17, wherein the advancer moves along a group of collated fasteners to load individual fasteners into the nosepiece.

19. The powered fastener driver of claim 18, wherein the rocker arm is rotated by the cam to move the advancer along the group of collated fasteners to engage a next fastener from the group of collated fasteners.

20. The powered fastener driver of claim 19, wherein in response to continued rotation of the cam, the rocker arm moves past the cam and the advancer is biased toward the nosepiece to deliver the next fastener into the nosepiece.

* * * * *